United States Patent [19]

Iki

[11] 3,995,257

[45] Nov. 30, 1976

[54] SEQUENTIAL CONTROL SYSTEM

[75] Inventor: Shunichi Iki, Sagamihara, Japan

[73] Assignee: Nissan Motor Co., Ltd., Japan

[22] Filed: June 19, 1975

[21] Appl. No.: 588,193

[30] Foreign Application Priority Data

Aug. 30, 1974   Japan............................ 49-100237

[52] U.S. Cl. ............................................ 340/172.5
[51] Int. Cl.² ............................................. G05B 1/03
[58] Field of Search ................................. 340/172.5

[56] References Cited
UNITED STATES PATENTS

| | | |
|---|---|---|
| 3,732,548 | 5/1973 | Howells et al. ................... 340/172.5 |
| 3,827,030 | 7/1974 | Seipp ................................ 340/172.5 |
| 3,832,696 | 8/1974 | Nakao et al. ..................... 340/172.5 |
| 3,887,902 | 6/1975 | Labalme ........................... 340/172.5 |

*Primary Examiner*—Raulfe B. Zache
*Attorney, Agent, or Firm*—Robert E. Burns; Emmanuel J. Lobato; Bruce L. Adams

[57] ABSTRACT

External inputs are compared with programmed conditions stored and if the former coincide with the latter, corresponding load operations are controlled.

3 Claims, 4 Drawing Figures

SEQUENTIAL CONTROL SYSTEM

BACKGROUND OF THE INVENTION

This invention relates generally to a control system and particularly to a sequential control system to compare external inputs with programmed conditions and then, if they are equal, to control load operations.

Various sequential control systems have been developed that employ memory means such as a random-access or a read-only memories. These systems may be classified into certain types from the aspect of softwares; that is, a type of programming according to a flow-chart, a type of programming by using logic algebra, and so on. However, some problems are encountered in the conventional control systems as follows: that is, they require considerable time for beginners to grow familiar with them, and furthermore require remarkable efforts for programming due to their complicated configurations.

SUMMARY OF THE INVENTION

Therefore, an object of the present invention is to provide an improved sequential control system, wherein a concept of the programming resembles that of arranging a looped electrical series circuit so that the programming can be very easily accomplished.

BRIEF DESCRIPTION OF THE DRAWINGS

These and other objects, features and many of the attendant advantages of this invention will be appreciated more readily as the invention becomes better understood by the following detailed description, when considered in connection with the accompanying drawings, wherein like parts in each of the several figures are identified by the same reference characters, and wherein.

DESCRIPTION OF THE PREFERRED EMBODIMENT

Figure 4:
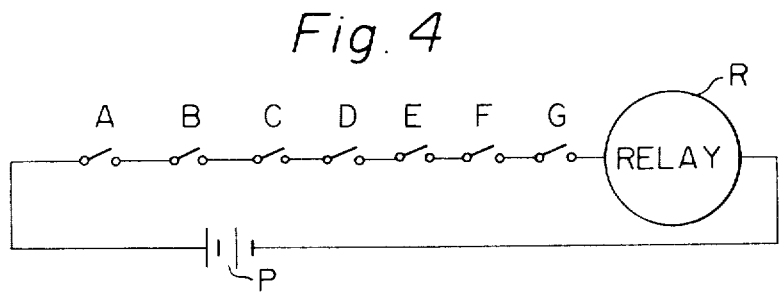
FIG. 4 shows a looped electrical series circuit which represents a concept of a programming in accordance with the present invention.

Prior to detailed description of the invention, it will be preferable to explain a concept of a sequential control system according to the invention. The concept, in brief, resembles an arrangement of a looped electrical series circuit as illustrated in FIG. 4. The FIG. 4 circuit consists of a sort of on/off switches A to G, a relay R, and a power source P. The switches A to G correspond to input informations during one operation cycle, which are stored in the control system and are compared with actual input conditions outside the system. On the other hand the relay R corresponds to an output circuit of the control system. Therefore, the relay R can be energized only when all the switches A to G are closed at the same time. This means that only when all the stored input informations coincide with the actual input conditions, the output circuit produces a true output or a logic 1 thereby controlling the operations of loads connected to the system. The above-mentioned concept of the invention remains unchanged even if the number of the input informations are reduced or increased, which is a very important feature of the invention and is achieved by an improved means discussed later in detail.

Figure 1:
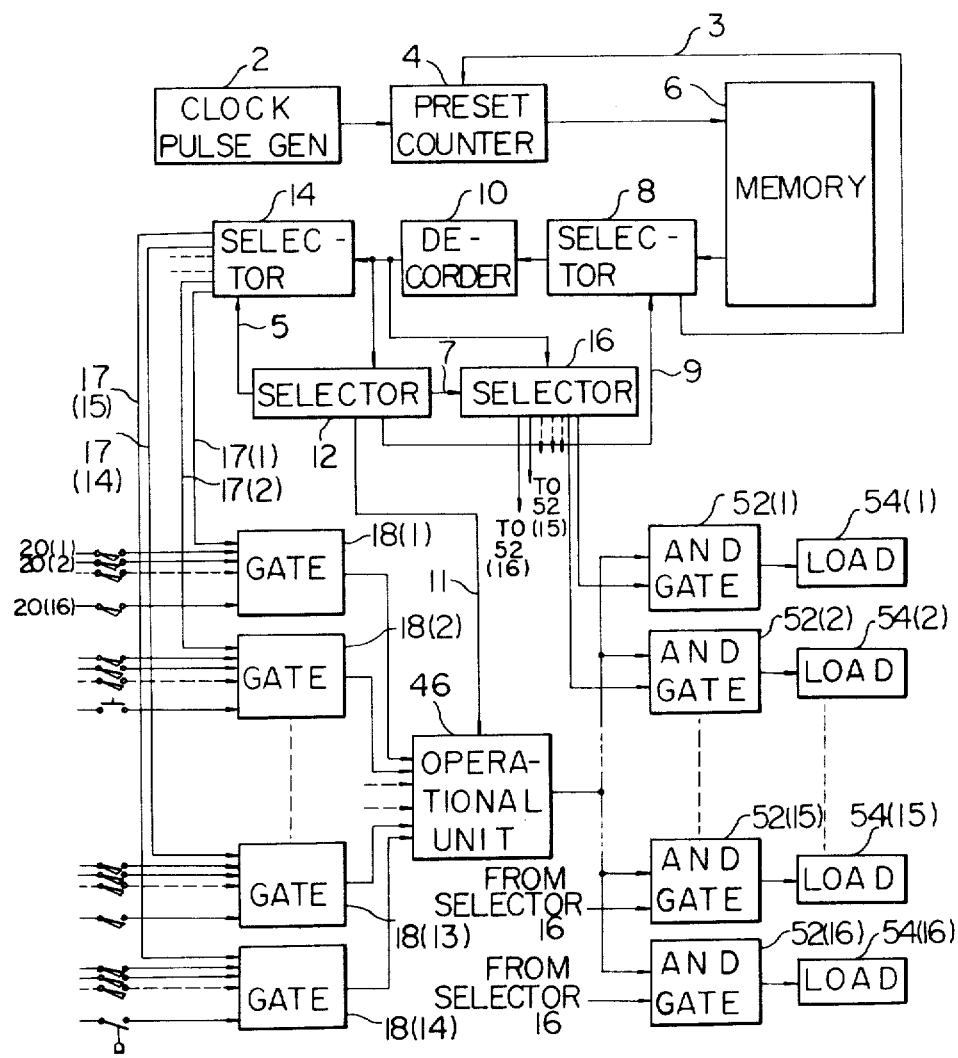
FIG. 1 shows, in a block diagram, a sequential control system embodying the present invention.

Reference is now made to FIG. 1, wherein a preferred embodiment of the present invention is schematically depicted in a block diagram. Reference numeral 2 denotes a suitable clock pulse generator of any conventional type which generates clock pulses every predetermined time interval in order to sequentially advance operating steps of the FIG. 1 system. The clock pulses are then applied to a preset counter or a memory address register 4 of any conventional type, which counts the number of the clock pulses supplied thereto to feed address signals to a memory 6 every time when the number of the clock pulses reaches a preset value. Each of the address signals contains an address of a byte or a word which is to be read from the memory 6. In the present embodiment, the memory 6 is of a read-only memory type but it is not restricted to that type only. Thus, the control informations stored in the bytes or words within the memory 6 are sequentially read out therefrom and fed to a selector 8. The selector 8 receives instruction signals such as, for example, SKIP or JUMP instructions from a selector 12 over a conductor 9 to control the operation of the preset counter 4 according to received instructions through a conductor 3. The selector 8, when not instructed by the selector 12, transmits the informations from the memory 6 to a decorder 10. The decorder 10 converts the informations of binary numbers into, for example, those of hexadecimal numbers. The bytes or words, which are transmitted to the decorder 10, contain three kinds of informations, that is, input, output, and instruction signals. The decorded control informations are fed to three selectors 12, 14, and 16 which select respectively instruction, input, and output signals. In the above, the selector 12, which selects the instruction signals, controls, for example, transmitting operations of the selectors 14 and 16 over conductors 5 and 7. In other words, whether or not the selectors 14 and 16 can transfer the input and output signals to next stages depends on instructions from the selector 12.

To facilitate the explanation of the operation of the FIG. 1 system, assume that each of the control informations is included in 8 bits. If the 8 bits are divided into two equal parts, it is understood that the first group can represent $2^4 = 16$ different informations and the second one can represent 16 informations for each information of the first group, and therefore, 256 informations are obtainable at maximum. By way of example, 14 informations of the first group are used for selecting 14 AND gates 18(1) – 18(14) and the 15th information thereof is used for indicating that the 16 informations of the second group therefor are instruction signals such as, for example, SKIP or JUMP as previously mentioned, and the last 16th information thereof is used for indicating that the 16 informations of the second group therefor represent 16 AND gates 52(1) – 52(16).

Figure 2:
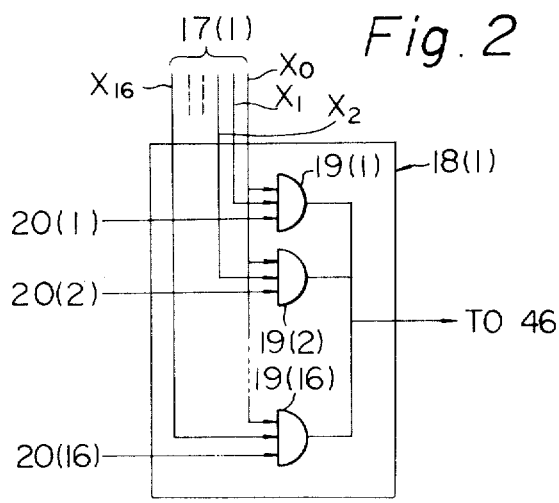
FIGS. 2 and 3 show parts of the FIG. 1 system.

Reference is made to FIG. 2, wherein the AND gate 18(1) is depicted in detail. As shown, the gate 18(1) comprises 16 AND gates 19(1) – 19(16) each of which has three input terminals connected to one of the switches of any suitable external devices 20(1) – 20(16) and to the selector 14 through conductor 17(1). The conductor 17(1) includes 17 lines $X_0$–$X_{16}$ wherein $X_0$ serves to connect the selector 14 to all the AND gates 19(1) — 19(16), and $X_1$ to connect the selector 14 to the AND gate 19(1), $X_2$ to the AND gate 19(2), and so on. In the above, if the switching conditions of the device 20(2) should be checked, the selector 14 supplies a logic 1 to the AND gate 19(2) of the gate 18(1) through the lines $X_0$ and $X_1$. In this specification, detailed description as to other gates 18(2) — 18(14) will be omitted since they have the same logic configurations and functions as the gate 18(1). The outputs of the AND gates 19(1) − 19(16) are connected with one another to become the output of the gate 18(1), which is in turn coupled to an operational unit 46 as best shown in FIG. 1. Similarly, the outputs of other gates 18(2) — 18(14) are also connected to the operational unit 46. The unit 46 comprises a suitable register 47 and an AND gate 48 as shown in FIG. 1. The register 47 temporarily stores the logic signals which are applied at different times from 18(1) — 18(14), and then feeds them to the AND gate 48 at the same time. The AND gate 48 produces, as is well known, a logic 1 only when all the inputs are logic 1.

Thus, the output of the operational unit 46 is fed to other AND gates 52(1) — 52(16) which also receive the output signals from the selector 16 as illustrated in FIG. 1. Therefore, each load 54(1) — 54(16), which is connected to one of the AND gates 52(1) — 52(16), is actuated only when the output from the selector 16 to the corresponding AND gate coincides with the output from the operational unit 46.

Figure 3:
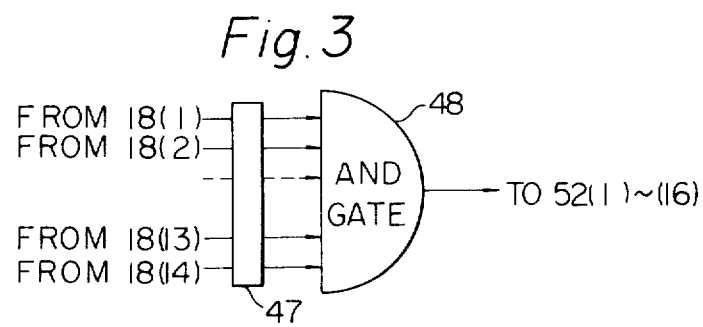

Returning back to FIG. 3 and assuming that the number of the input terminals of the AND gate 48 is represented by n and the number of logic signals from the gates 18(1) — 18(14) to the gate 48 is represented by m, then the following three kinds of conditions take place; that is, $m=n$, $m<n$, and $m>n$. If, $m=n$, the AND gate 48 operates in a usual manner. However, if $m<n$, each of the input terminals n−m, to which no signal is applied from the preceding stages, is forcibly set to a logic 1 by suitable means (not shown) controlled by the selector 12 over a conductor 11, and then the AND gate 48 operates in a usual manner. Finally, if $m>n$, the AND gate 48 operates in the same manner as in the case of $m=n$ until the number of the signals, which are not yet dealt with by the gate 48, become less than n. If follows, that the AND gate 48 operates in the same manner as in the case of $m<n$. In the last case, however, if one of the inputs of the AND gate 48 is a logic 0, the following operations thereof are not necessary because only one "false" information causes the overall result to be "false".

From the above, it is understood that according to the present invention the programming is done very easily just like arranging a looped electrical series circuit as discussed in connection with FIG. 4.

What is claimed is:

1. A sequential control system for sequentially controlling corresponding loads operations in accordance with a predetermined process, and comprises;

first means for storing control informations, each of which includes first, second and third control, signals and is sequentially read out by an address signal applied to said first means, said first control signals each being capable of containing n input control informations at a maximum, where n is a positive integer greater than one, and said second control signals serving to control the operations of the loads, second means including n first AND gates, each of which is operatively connected to said first means for receiving both the input control information therefrom and external input signals from the outside of said control system to produce a logic output at its output terminal, and said second means, during one operational cycle, receiving m input control informations from said first means through the first AND gates, where m is a positive integer greater than one and has a relationship to n under three kinds of conditions, that is, $m=n$, $m<n$, and $m>n$, third means including a second AND gate having n input terminals connected respectively to the n output terminals of said n first AND gates to receive the logic outputs therefrom and then producing a logic output at its output terminal, fourth means comprising n third AND gates, each of which is operatively connected to both said first means and the output terminal of said third means to receive, from the former, said second control signals and, from the latter, the logic output and then producing a logic output at its output terminal in order to control the operation of the load connected thereto.

2. A sequential control system according to claim 1, further comprising a first selector operatively interposed between said first means and said second means for receiving said control informations to select said first control signal and then transmitting it to the latter, second selector operatively interposed between said first means and said fourth means for receiving said control information from the former to select said third control signals and then transmitting them to the latter, and third selector operatively connected to said first means for receiving said control informations therefrom to select said third control signals and controlling the operations of said sequential control system.

3. A sequential control system according to claim 2, where if $m=n$, said second AND gate operates in usual manner, if $m<n$, each of the n−m input terminals of said second AND gate being forcibly set to a logic 1 and then operating in the same manner as in the case of $m=n$, and if $m>n$, said second AND gate operating in the same manner as is the case of $m=n$ until the number of the signals, which are not yet applied to said second AND gate, become less than n and then operating in the same manner as in the case of $m<n$.

* * * * *